US012797871B2

(12) United States Patent
Sethi

(10) Patent No.: US 12,797,871 B2
(45) Date of Patent: Nov. 17, 2026

(54) SMOOTH BORE NOZZLE

(71) Applicant: HEN Nozzles Inc., Castro Valley, CA (US)

(72) Inventor: Sunny Sethi, Castro Valley, CA (US)

(73) Assignee: HEN NOZZLES INC., Castro Valley, CA (US)

( * ) Notice: Subject to any disclaimer, the term of this patent is extended or adjusted under 35 U.S.C. 154(b) by 1068 days.

(21) Appl. No.: 17/828,087

(22) Filed: May 31, 2022

(65) Prior Publication Data

US 2022/0297138 A1 Sep. 22, 2022

Related U.S. Application Data

(63) Continuation-in-part of application No. 17/112,993, filed on Dec. 5, 2020, now Pat. No. 11,779,938, (Continued)

(51) Int. Cl.
*B05B 1/18* (2006.01)
*B05B 1/04* (2006.01)

(52) U.S. Cl.
CPC .............. *B05B 1/182* (2025.08); *B05B 1/042* (2013.01); *B05B 1/044* (2013.01)

(58) Field of Classification Search
CPC ........... B05B 1/06; B05B 1/044; B05B 1/185; A62C 31/02; A62C 31/05
(Continued)

(56) References Cited

U.S. PATENT DOCUMENTS 28,865 A 6/1860 Howells
147,107 A 2/1874 Dampman
(Continued)

FOREIGN PATENT DOCUMENTS

CH 240951 2/1946
CN 105498134 B 9/2018
(Continued)

OTHER PUBLICATIONS

U.S. Final Office Action issued Jan. 12, 2023 which pertains to U.S. Appl. No. 17/112,990, filed Dec. 5, 2020, 14 pages.
(Continued)

*Primary Examiner* — Jason J Boeckmann
(74) *Attorney, Agent, or Firm* — Thompson Hine LLP

(57) ABSTRACT

A smooth bore nozzle includes an inlet section having planar converging inlet side walls and top and bottom walls forming an unobstructed rectangular inlet section fluid passageway; a straight section having planar side walls and top and bottom walls contiguous with the inlet side walls and top and bottom walls forming an unobstructed rectangular straight section fluid passageway; and an outlet section having planar converging outlet top and bottom walls and diverging outlet side walls contiguous with the straight section side walls and top and bottom walls, and an unobstructed rectangular outlet section fluid passageway; wherein the cross-sectional area of the fluid passageway remains constant or decreases in a downstream direction, and a perimeter of the cross section increases along a length of the inlet section, and a perimeter of a cross section of the rectangular outlet section fluid passageway decreases along a length of the outlet section.

19 Claims, 11 Drawing Sheets

Related U.S. Application Data which is a continuation-in-part of application No. 16/595,218, filed on Oct. 7, 2019, now abandoned, application No. 17/828,087, filed on May 31, 2022 is a continuation of application No. 17/112,990, filed on Dec. 5, 2020, now Pat. No. 12,103,018, which is a continuation-in-part of application No. 16/595,218, filed on Oct. 7, 2019, now abandoned, application No. 17/828,087, filed on May 31, 2022 is a continuation-in-part of application No. PCT/US2021/038393, filed on Jun. 22, 2021, which is a continuation of application No. 17/112,993, filed on Dec. 5, 2020, now Pat. No. 11,779,938, and a continuation of application No. 17/112,990, filed on Dec. 5, 2020, now Pat. No. 12,103,018.

(60) Provisional application No. 62/880,567, filed on Jul. 30, 2019.

(58) Field of Classification Search
USPC .......................................... 239/589, 592–595
See application file for complete search history.

(56) References Cited

U.S. PATENT DOCUMENTS

| | | | | |
|---|---|---|---|---|
| 177,239 | A | 5/1876 | Haley | |
| 579,418 | A | 3/1897 | Bookwalter | |
| 583,969 | A | 6/1897 | Askins | |
| 768,095 | A | 8/1904 | Twist | |
| 927,449 | A | 7/1909 | Carnahan | |
| 1,067,069 | A | 7/1913 | Smith | |
| 1,445,208 | A | 2/1923 | Forward | |
| RE20,488 | E | 8/1937 | Zinkil | |
| 2,092,897 | A | 9/1937 | Sudhaus | |
| 2,130,173 | A | 9/1938 | Barnes | |
| 2,166,300 | A | 7/1939 | Komar | |
| 2,959,359 | A | 11/1960 | Casaletto | |
| 3,101,906 | A | 8/1963 | Webber | |
| 3,104,906 | A | 9/1963 | Adams | |
| 3,776,470 | A | 12/1973 | Tsuchiya | |
| 4,380,319 | A | 4/1983 | Shigut | |
| 4,572,165 | A | 2/1986 | Dodier | |
| 4,789,104 | A | 12/1988 | Anderson | |
| 4,986,477 | A | 1/1991 | Roman | |
| 5,283,990 | A | 2/1994 | Shank, Jr. | |
| 5,704,825 | A | 1/1998 | LeCompte | |
| 5,850,971 | A * | 12/1998 | Smith | B05B 7/1495 239/420 |
| 5,975,996 | A | 11/1999 | Settles | |
| 6,129,293 | A | 10/2000 | Jäger | |
| 6,293,857 | B1 | 9/2001 | Allard | |
| 6,598,810 | B2 | 7/2003 | Lanteri | |
| 6,626,738 | B1 | 9/2003 | Shank | |
| 6,969,015 | B1 | 11/2005 | Salmela | |
| 7,669,780 | B2 | 3/2010 | Sugano et al. | |
| 9,649,644 | B2 | 5/2017 | Sloan | |
| 2005/0205696 | A1 | 9/2005 | Saito | |
| 2006/0049273 | A1 | 3/2006 | Zhang | |
| 2009/0065612 | A1 | 3/2009 | Gardner | |
| 2009/0193615 | A1 | 8/2009 | Nguyen | |
| 2014/0131484 | A1 | 5/2014 | Gomez et al. | |
| 2018/0236465 | A1 | 8/2018 | Krayer | |
| 2021/0086006 | A1 * | 3/2021 | Sethi | B05B 1/3402 |
| 2021/0086203 | A1 | 3/2021 | Sethi | |
| 2022/0176177 | A1 | 6/2022 | Sethi et al. | |

FOREIGN PATENT DOCUMENTS

| | | | |
|---|---|---|---|
| EP | 1106212 | A1 | 6/2001 |
| KR | 950009378 | B1 | 8/1995 |
| NL | 8900809 | | 11/1990 |
| WO | 2016/031612 | A1 | 3/2016 |
| WO | 2017/195939 | A1 | 11/2017 |

OTHER PUBLICATIONS

U.S. Non-Final Office Action issued Jul. 13, 2021 which pertains to U.S. Appl. No. 16/595,218, filed Oct. 7, 2019, 11 pages.
U.S. Final Office Action issued Dec. 6, 2021 which pertains to U.S. Appl. No. 16/595,218, filed Oct. 7, 2019, 8 pages.
International Search Report and Written Opinion issued Jan. 24, 2022 which pertains to PCT Application No. PCT/US2021/038393, filed Jun. 22, 2021, 17 pages.
Invitation to Pay Additional Fees issued Nov. 11, 2021 which pertains to PCT Application No. PCT/US2021/038393, filed Jun. 22, 2021, 11 pages.
International Search Report and Written Opinion issued Apr. 4, 2022 which pertains to PCT Application No. PCT/US2022/012242, filed Jan. 13, 2022, 9 pages.
International Search Report and Written Opinion issued Aug. 18, 2022 which pertains to PCT Application No. PCT/US2022/030831, filed May 25, 2022, 12 pages.
International Search Report and Written Opinion issued Aug. 19, 2022 which pertains to PCT Application No. PCT/US2022/030833, filed May 25, 2022, 8 pages.
U.S. Final Office Action issued Jun. 6, 2023 which pertains to U.S. Appl. No. 17/112,993, filed Dec. 5, 2020, 23 pages.
Wipo, International Preliminary Report on Patentability issued Jun. 15, 2023 which pertains to PCT Application No. PCT/US2021/038393, filed Jun. 22, 2021, 12 pages.
U.S. Non-Final Office Action issued Sep. 23, 2022 which pertains to U.S. Continuation-In-Part U.S. Appl. No. 17/112,990, 25 pages.
English Translation of CH 240951 (Feb. 15, 1946).
WIPO, International Preliminary Report on Patentability issued Jan. 4, 2024, which pertains to PCT Application No. PCT/US2022/012242. 8 pages.
WIPO, International Preliminary Report on Patentability issued Jan. 4, 2024, which pertains to PCT Application No. PCT/US2022/030831. 12 pages.
WIPO, International Preliminary Report on Patentability issued Jan. 4, 2024, which pertains to PCT Application No. PCT/US2022/030833. 7 pages.
U.S. Non-Final Office Action issued May 31, 2023 which pertains to U.S. Appl. No. 17/112,990, filed Dec. 5, 2020, 20 pages.
U.S. Non-Final Office Action issued Dec. 2, 2021 which pertains to U.S. Appl. No. 17/112,993, filed Dec. 5, 2020, 16 pages.
U.S. Non-Final Office Action issued Dec. 13, 2023, which pertains to U.S. Continuation-In-Part U.S. Appl. No. 17/112,990, filed Dec. 5, 2020. 26 pages,
U.S. Final Office Action issued Jun. 10, 2024, which pertains to U.S. Continuation-In-Part U.S. Appl. No. 17/112,990, filed Dec. 5, 2020. 28 pages,
U.S. Patent and Trademark Office, Advisory Action, U.S. Appl. No. 17/112,990, 3 pages, Apr. 20, 2023.
U.S. Patent and Trademark Office, Notice of Allowance, U.S. Appl. No. 17/112,990, 6 pages, Aug. 21, 2024.
U.S. Patent and Trademark Office, Notice of Allowance, U.S. Appl. No. 17/112,993, 7 pages, Aug. 23, 2023.

* cited by examiner

SMOOTH BORE NOZZLE

GOVERNMENT LICENSE RIGHTS

This invention was made with government support under Contract No. 2127461 awarded by The National Science Foundation. The government has certain rights in the invention.

TECHNICAL FIELD

The present invention relates to nozzles for spraying fluids, and more particularly to nozzles for spraying liquids under pressure.

BACKGROUND

Nozzles are used to receive a fluid under pressure and control the shape and other characteristics of the stream of the fluid as it exits the nozzle. Such nozzles typically have an inlet opening, an exit opening that may take the form of a single orifice or multiple orifices, and a fluid flow path extending between the inlet opening and the exit opening. The inlet opening may include a fitting, which may be circular in cross section, for connecting the nozzle to a complementary fitting on a tank, flexible hose, or pipe.

Nozzles frequently are designed to increase the velocity of the fluid entering the nozzle to project the fluid stream exiting the nozzle in a long trajectory. This is achieved by providing the nozzle with a constriction in the fluid flow path. The constriction may take the form of a decrease in cross-sectional area from the nozzle inlet opening to the exit opening and/or an orifice or other restriction in the fluid flow path that effectively reduces the cross-sectional area of fluid flow. Providing such a constriction to fluid flow under constant pressure and constant volume flow rate results in the increase in fluid flow velocity. In some nozzles, the nozzle outlet orifice itself is reduced in cross-sectional area relative to the nozzle inlet and provides the constriction to increase velocity of fluid flow.

Fluid conduits having a flow path defined by smooth continuous nozzle walls and an absence of internal obstructions provide laminar flow of the fluid flowing through them. Laminar fluid flow is desirable over turbulent fluid flow because it optimizes fluid flow through the nozzle and provides a uniform spray from the exit opening. A disadvantage with some nozzle designs is that obstructions, sharp corners, and abrupt changes in fluid flow direction in the fluid flow path of a nozzle create obstructions in the flow of fluid through the nozzle that create turbulence in the flow of fluid through the nozzle. Turbulence in fluid flow through nozzles is undesirable in applications where spray from the exit opening that is uniform across the width of the nozzle exit opening is desired. The reach or throw distance of the fluid exiting a nozzle is the distance the fluid travels before the stream loses its momentum and/or integrity. Turbulence of the fluid in the nozzle also reduces the fluid velocity and negatively impacts the reach and penetration of the fluid. Accordingly, there is a need for a nozzle that adjusts the effective cross-sectional area of the exit opening to vary the shape of the fluid stream from the exit opening but that does not present inclusions, obstructions, or sharp corners in the fluid flow path through the nozzle that create turbulence in the fluid. There is also a need for a compact nozzle that is rugged and yet provides optimal laminar fluid flow.

SUMMARY

The present disclosure describes a nozzle and the method of its operation that optimizes fluid flow through the nozzle and consequently the throw distance and coverage of the fluid stream exiting the nozzle. The nozzle can be used to project a uniform stream a distance greater than current nozzle designs for a given fluid flow rate. The fluid flow pathway of the nozzle is smooth and free of obstructions, which promotes laminar fluid flow resulting in a fluid flow stream that is uniform along its width and along its length. The fluid flow path in the nozzle includes a constriction that is designed to increase fluid flow velocity while minimizing turbulence to provide maximum exit stream distance.

In an exemplary embodiment, a nozzle includes an inlet section having a first and a second smooth, planar opposing converging inlet side walls contiguous with smooth, planar opposing converging inlet top and bottom walls. The first and the second inlet side walls and the inlet top and bottom walls form an inlet section opening, an inlet section outlet opening, and an unobstructed oblong inlet section fluid passageway from the inlet section opening to the inlet section outlet opening.

The inlet section transitions to a straight section having first and second smooth, planar opposing parallel side walls contiguous with the first and the second inlet side walls, respectively, and contiguous with smooth, planar opposing parallel top and bottom walls that are contiguous with the inlet top and bottom walls, respectively. The first and the second opposing parallel side walls and the opposing parallel top and bottom walls form a straight section inlet opening attached to receive the fluid from the inlet section outlet opening, a straight section outlet opening, and an unobstructed rectangular straight section fluid passageway from the straight section inlet opening to the straight section outlet opening.

The straight section transitions to an outlet section having smooth, planar opposing converging outlet top and bottom walls contiguous with the parallel top and bottom walls, respectively, and contiguous with first and second opposing diverging outlet side walls that are contiguous with the opposing parallel side walls. The outlet top and bottom walls are contiguous with the first and the second outlet side walls to form an outlet section inlet opening attached to receive the fluid from the straight section outlet opening and a frustum-shaped, unobstructed rectangular outlet section fluid passageway from the outlet section inlet opening to terminate in an oblong outlet opening.

A cross-sectional area of the rectangular inlet fluid passageway and a cross-sectional area of the rectangular outlet section fluid passageway remain constant or decrease in a downstream direction, and a perimeter of a cross section of the rectangular inlet section remains constant along a length of the inlet section and a perimeter of a cross section of the rectangular outlet section fluid passageway increases along a length of the outlet section.

In another embodiment, a nozzle includes an inlet section having a first and a second smooth, planar opposing inlet side walls and smooth, planar opposing inlet top and bottom walls. The first and the second inlet side walls and the inlet top and bottom walls are contiguous and form an inlet opening, an inlet section outlet opening, and an unobstructed rectangular frustum-shaped inlet section fluid passageway from the inlet section inlet opening to the inlet section outlet opening At least one pair of the first and second opposing inlet side walls and the inlet top and bottom walls converge such that a cross sectional area of the inlet section fluid passageway decreases continuously from the inlet section inlet opening to the outlet section outlet opening.

A straight section has first and second smooth, planar opposing parallel side walls contiguous with the first and the second inlet side walls, respectively, and having smooth, planar opposing parallel top and bottom walls that are contiguous with the inlet top and bottom walls, respectively, wherein the first and the second opposing parallel side walls and the opposing parallel top and bottom walls form a straight section inlet opening attached to receive the fluid from the inlet section outlet opening, a straight section outlet opening, and an unobstructed rectangular straight section fluid passageway from the straight section inlet opening to the straight section outlet opening. The straight section creates a smooth transition between the converging inlet section and diverging outlet section.

An outlet section has smooth, planar opposing converging outlet top and bottom walls contiguous with the parallel top and bottom walls, respectively, and contiguous with first and second opposing diverging outlet side walls that are contiguous with the opposing parallel side walls. The outlet top and bottom walls are contiguous with the first and the second outlet side walls to form an outlet section inlet opening attached to receive the fluid from the straight section outlet opening and an unobstructed rectangular outlet section fluid passageway from the outlet section inlet opening to terminate in an oblong outlet opening.

At least one pair of the first and second opposing outlet side walls and the outlet top and bottom walls diverge such that a cross sectional area of the outlet section fluid passageway decreases continuously from the outlet section inlet opening to the oblong outlet opening. As the cross-sectional area of the rectangular inlet fluid passageway and a cross-sectional area of the rectangular outlet section fluid passageway decrease in a downstream direction, a perimeter of a cross section of the rectangular inlet section decreases along a length of the inlet section and a perimeter of a cross section of the rectangular outlet section fluid passageway increases along a length of the outlet section The rectangular inlet fluid passageway, the straight section fluid passageway, and the outlet section fluid passageway together define a continuous nozzle fluid passageway that is bilaterally symmetrical about a central axis of the nozzle extending in a fluid flow direction.

In yet another embodiment, a method of making a nozzle includes forming an inlet section having a first and a second smooth, planar opposing converging inlet side walls and smooth, planar opposing converging inlet top and bottom walls; attaching the first and the second inlet side walls to the inlet top and bottom walls to form an inlet opening, an inlet section outlet opening, and an unobstructed rectangular inlet section fluid passageway from the inlet opening to the inlet section outlet opening. A straight section having first and second smooth, planar opposing parallel side walls and smooth, planar opposing parallel top and bottom walls is formed such that the first and the second parallel side walls are attached to the parallel top and bottom walls to form a straight section inlet opening, a straight section outlet opening, and an unobstructed rectangular straight section fluid passageway from the straight section inlet opening to the straight section outlet opening.

The first and the second parallel side walls are attached to the first and the second inlet side walls, respectively, and the parallel top and bottom walls are attached to the converging inlet top and bottom walls to receive the fluid from the inlet section outlet opening. An outlet section having smooth, planar opposing converging outlet top and bottom walls and first and second smooth, planar opposing diverging outlet side walls that are contiguous with the opposing converging outlet top and bottom walls is formed to form an outlet section inlet opening attached that receives fluid from the straight section outlet opening and an unobstructed rectangular outlet section fluid passageway from the outlet section inlet opening to terminate in an oblong outlet opening.

The outlet top and bottom walls are attached to the parallel top and bottom walls and attaching the first and second opposing diverging outlet side walls to the first and the second parallel side walls. A cross-sectional area of the rectangular inlet section fluid passageway and a cross-sectional area of the rectangular outlet section fluid passageway decrease in a downstream direction, and a perimeter of a cross section of the rectangular inlet section remains constant along a length of the inlet section and a perimeter of a cross section of the rectangular outlet section fluid passageway decreases along a length of the outlet section. The rectangular inlet fluid passageway, the straight section fluid passageway, and the outlet section fluid passageway together define a continuous nozzle fluid passageway symmetrical about a bilateral axis of symmetry of the nozzle extending in a fluid flow direction.

Other objects and advantages of the disclosed smooth bore nozzle will be apparent from the following description, the accompanying drawings, and the appended claims.

DETAILED DESCRIPTION

Figure 1:
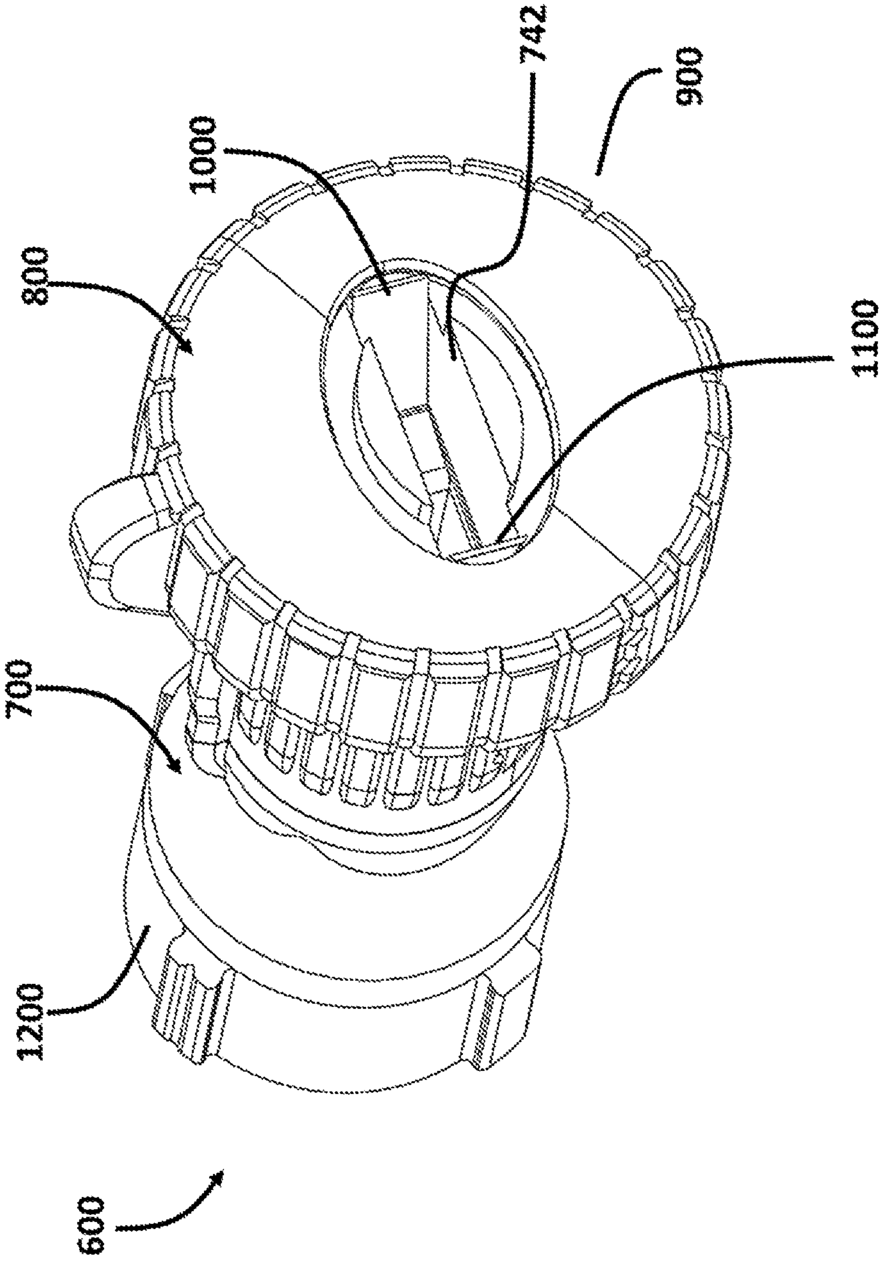
FIG. 1 is a perspective view of an exemplary embodiment of the disclosed smooth bore nozzle.
Figure 2:
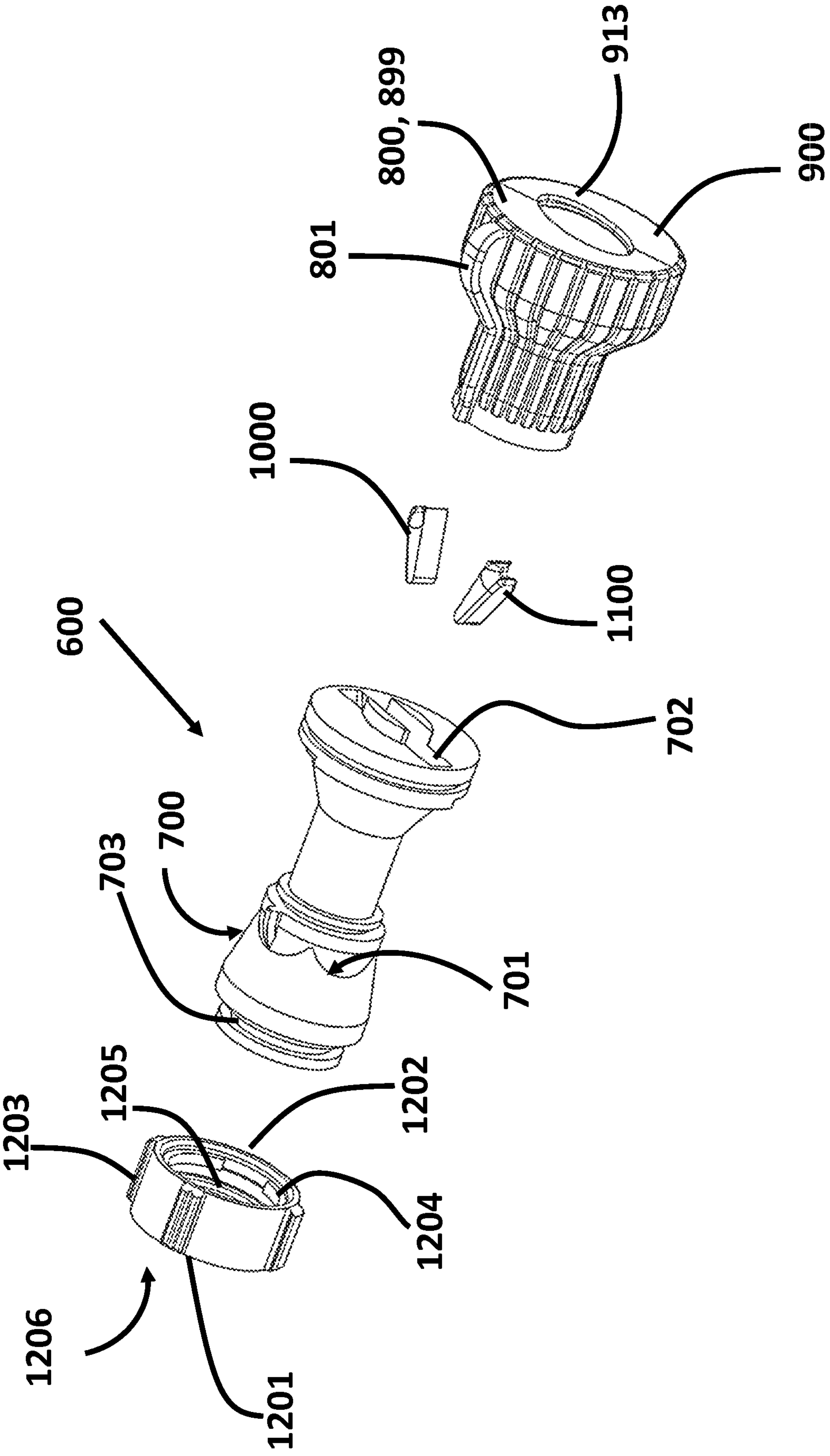
FIG. 2 is an exploded perspective view of the smooth bore nozzle of FIG. 1.

As shown in FIGS. 1, 2, 3, and 6, in an exemplary embodiment, the smooth bore nozzle assembly, generally designated 600, includes a nozzle body, generally designated 700, having an inlet section 701 with first and a second smooth, planar opposing converging inlet side walls 713, 714, contiguous with smooth, planar opposing converging inlet top and bottom walls 715, 716 that defines an inlet section flow path T2. The first and the second inlet side walls 713, 714 and the inlet top and bottom walls 715, 716 form an inlet section opening 717, an inlet section outlet opening 718, and an unobstructed rectangular inlet section 701 from the inlet section opening to the inlet section outlet opening.

In an embodiment, the nozzle body 700 includes a transition section 501 (also designated T1) upstream of the inlet section T2. The transition section 501 transitions from a round cross section to the rectangular cross section of the inlet section 701. In an embodiment, the nozzle body 700 includes a fitting 1205 that takes the form of a threaded swivel adaptor 1205 that attaches the adjustable nozzle 600 to a source of fluid under pressure, such as a hose, and in embodiments, a firehose. The fitting 1205 is secured to the nozzle body 700 by a retaining ring 1204 that is seated in an annular recess 703, which permits relative rotation of the fitting and the nozzle body 700. In an embodiment, the transition section T1 and the inlet section T2 are unitary.

The nozzle body 700 includes a straight section 502 having first and second smooth, planar opposing parallel side walls 719, 720 contiguous with the first and the second inlet side walls 713, 714, respectively, and contiguous with smooth, planar opposing parallel top and bottom walls 722, 724, respectively, that are contiguous with the inlet top and bottom walls 715, 716. The first and second parallel side walls 719, 720 and opposing parallel top and bottom walls 722, 724, define a straight section flow path T3. The first and second parallel side walls 719, 720 and the first and the second inlet side walls 713, 714 are contiguous with the inlet top and bottom walls 715, 716, respectively. The first and the second opposing parallel side walls 719, 720 and the opposing parallel top and bottom walls 722, 724 form a straight section inlet opening 726 attached to receive the fluid from the inlet section outlet opening 718, a straight section outlet opening 728, which together form the unobstructed rectangular straight section 502. The fluid passageway T3 of straight section 502 is a fluid passageway from the straight section inlet opening 726 to the straight section outlet opening 728 and functions as a fluid relaxation section of the nozzle body 700.

In embodiments, the nozzle body 700 includes an outlet section 730 having smooth, planar opposing converging outlet top and bottom walls 732, 734, respectively, contiguous with the parallel top and bottom walls 722, 724, respectively, and contiguous with first and second opposing diverging outlet side walls 736, 738, respectively, that are contiguous with the first and second parallel side walls 719, 720, forming an outlet flow passageway T4. The outlet top and bottom walls 732, 734 are contiguous with the first and the second outlet extension side walls 736, 738, respectively, to form an outlet section inlet opening 740 attached to receive the fluid from the straight section outlet opening 728. The outlet section 730 forms an unobstructed rectangular outlet section 730 from the outlet section inlet opening 740 to terminate in an oblong, fixed variable outlet opening 742.

In an exemplary embodiment, the inlet section 701, rectangular straight section 502, and outlet section 730 together form a continuous, linear, unobstructed fluid flow path D, which in embodiments represents a bilateral axis of symmetry of the nozzle. In an embodiment, cross-sectional area of the rectangular inlet section 701 and the rectangular outlet section 730 (as well as rectangular straight section 502) remain constant or decrease in a downstream direction of the fluid flow path D (i.e., the direction of arrow D), and a perimeter of a cross section of the rectangular inlet section 701 decreases along a length of the inlet section and a perimeter of a cross section of the rectangular outlet section 730 increases along a length of the outlet section. The fluid passageway T3 of the straight section 502 reduces turbulence of the fluid flowing through the nozzle 600 as the fluid velocity direction changes from converging in the transition section T1 and inlet section T2 to diverging in the outlet flow passageway T4.

In an embodiment in which the fluid is water, as water flows from inlet section 701 to straight section 502 and from the straight section to outlet section 730, in some nozzle geometries having converging inlet sections and diverging outlet sections the direction of the fluid flow D can change sharply. At such sharp transitions, turbulence is generated, causing fluid to move spirally. These spirally moving fluid are also known as eddies. These local eddies can persist downstream causing loss in water kinetic energy in the direction of fluid. This loss due to this sharp transition can be described by bend loss B that is given by the following equation:

$$B=(KV^2)/2g \qquad (1)$$

where K is dependent on the total length of the bend and the ratio of the curvature of the bend and the cross-section height. For a circular pipe the cross-section height is equivalent to the pipe diameter and for a square pipe the value is equivalent to the side of the square. Vis the average velocity of fluid flowing through the nozzle 600. However, by creating a transitional region (which in embodiments takes the form of straight section 502) between the converging section (inlet section 701) and diverging section (outlet section 730) the impact of change in fluid direction is reduced. This transitional region 502 is achieved by providing the nozzle 600 with a straight section 502. Straight section 502 minimizes the swirling motion of the local eddies to propagate in the fluid flow through the nozzle 600.

Figure 11:
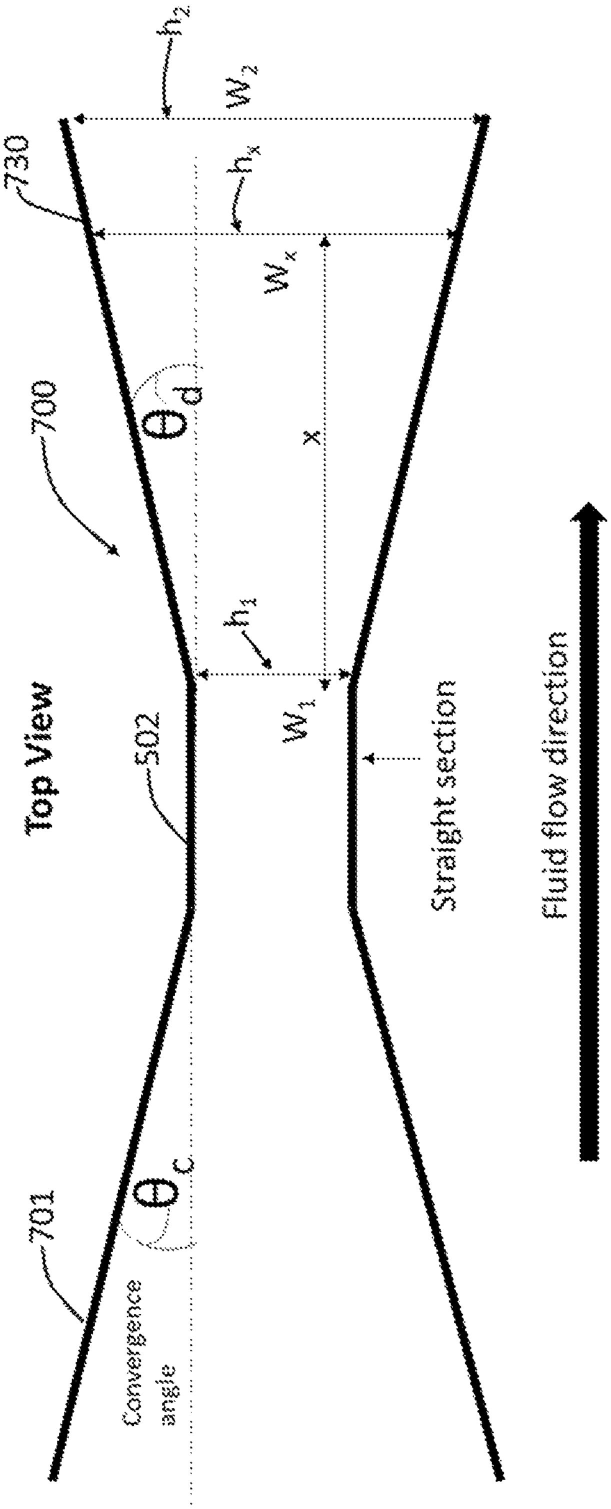
FIG. 11 is a schematic diagram of an embodiment of the disclosed smooth bore nozzle.

As shown in FIG. 11, to be effective in reducing eddies in the fluid flow path D, the length of the straight section 502 depends on the cross-section height $h_t$ and the convergence and divergence angles. For convergence and divergence angles $\theta_c$, $\theta_d$, respectively, of less than 15° with the center C of the linear fluid flow path D, the straight section 502 is at least 2 times the cross-section height $h_t$ at the transition region. For convergence and divergence angles $\theta_c$, $\theta_d$, respectively, of between 15° and 30° with the center C of the linear fluid flow path D, the straight section 502 is at least 4 times the cross-section height $h_t$ at the transition region. For divergence angle $\theta_d$ of greater than 30°, a two-step transition to mitigate local eddies associated with sudden change in fluid direction is necessary. The second transition step is dictated by a transitional divergence angle.

Figure 5:
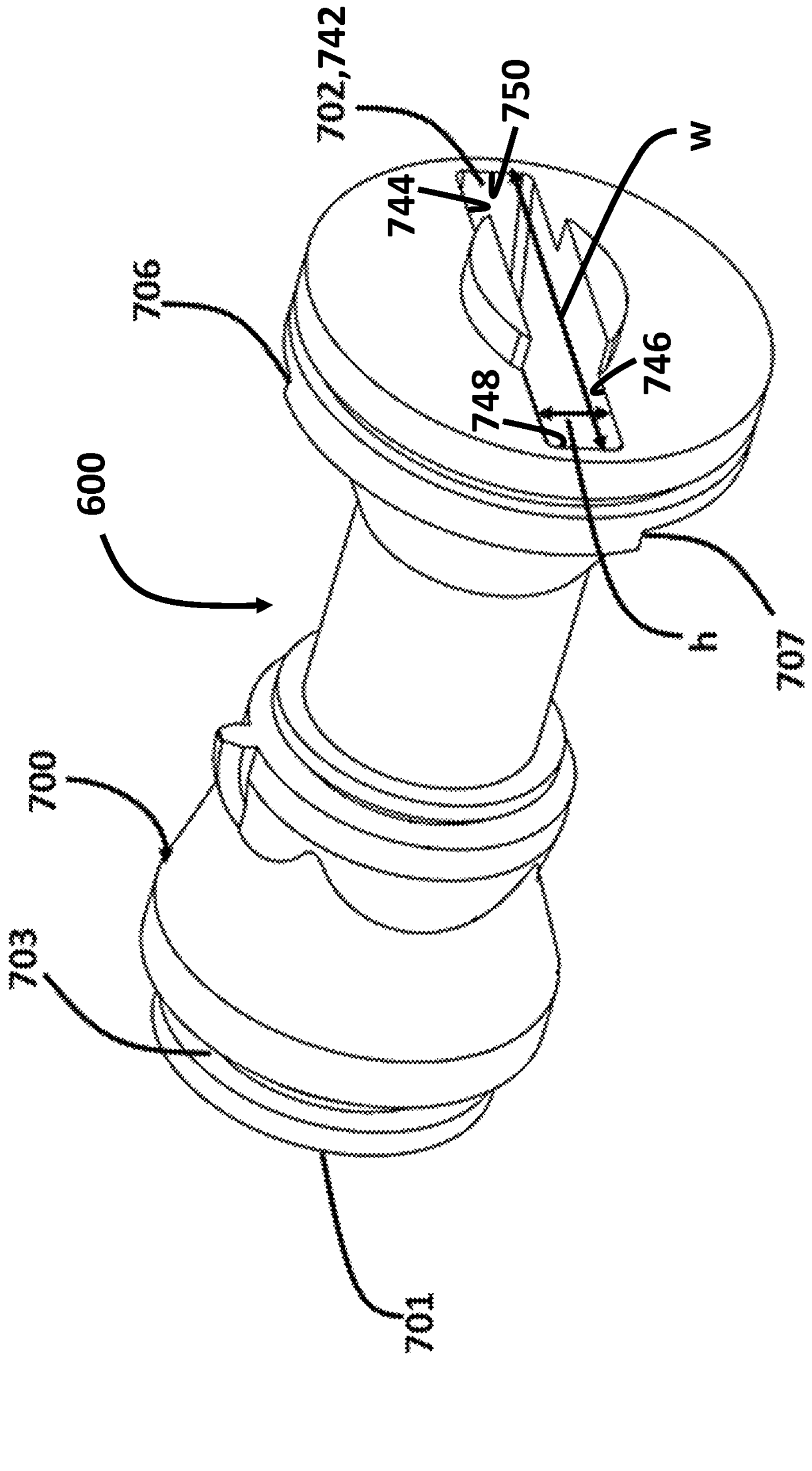
FIG. 5 is a perspective view of the smooth bore nozzle of FIG. 1 in which the adjustment collar is removed.

As the fluid goes from inlet section 701 (converging) to straight section 502 (straight section) and finally to outlet section 730 (diverging section), the cross-sectional area is either kept constant or reduced in the downstream direction of fluid flow path D to allow maximizing fluid velocity at the exit. In the outlet section 730, (the diverging section) the width dimension W of the fluid flow path D (see FIG. 5) increases continuously. If the width of cross-section in the straight section is $W_1$, width of the cross-section at the nozzle exit is $W_2$ and the width anywhere in between is $W_x$, where x denotes the distance from the end of the straight section, then, as shown in FIG. 11:

$$W_x=W_1+(2x\tan\theta_d) \qquad (2)$$

where $\theta_d$ is the divergence angle with respect to the straight section.

As the width W diverges, the height h (FIG. 6) needs to converge or reduce to maintain or reduce the cross-sectional area (W×h) of the fluid flow path D. If the height h at the end of the straight section 502 is $h_1$ and height at the end of the diverging section is $h_2$, and the height at distance x from the end of the straight section is $h_x$, then:

$$W1h1 \geq W_x h_x \geq W_2 h_2 \quad (3)$$

$$W_1 h_1 \geq W_x h_x \quad (4)$$

$$W_1 h_1 \geq (W_1 + (2x \tan \theta_d)) h_x \quad (5)$$

$$h_x = K[(W_1 h_1)/(w_1 + 2x \tan \theta_d)] \quad (6)$$

where $K \leq 1$ and depends on the ratio of cross-sectional area at the straight section and end of the diverging section.

In an embodiment, a rate of convergence (i.e., slope or angle made with the centerline C) of the opposing converging first and second inlet side walls 713, 714 and/or the converging inlet top and bottom walls 715, 716 is greater than a rate of divergence (i.e., slope or angle made with centerline D) of the first and the second opposing diverging outlet extension side walls 736, 738, such that a velocity of a fluid flowing through the nozzle 600 increases.

Figure 3:
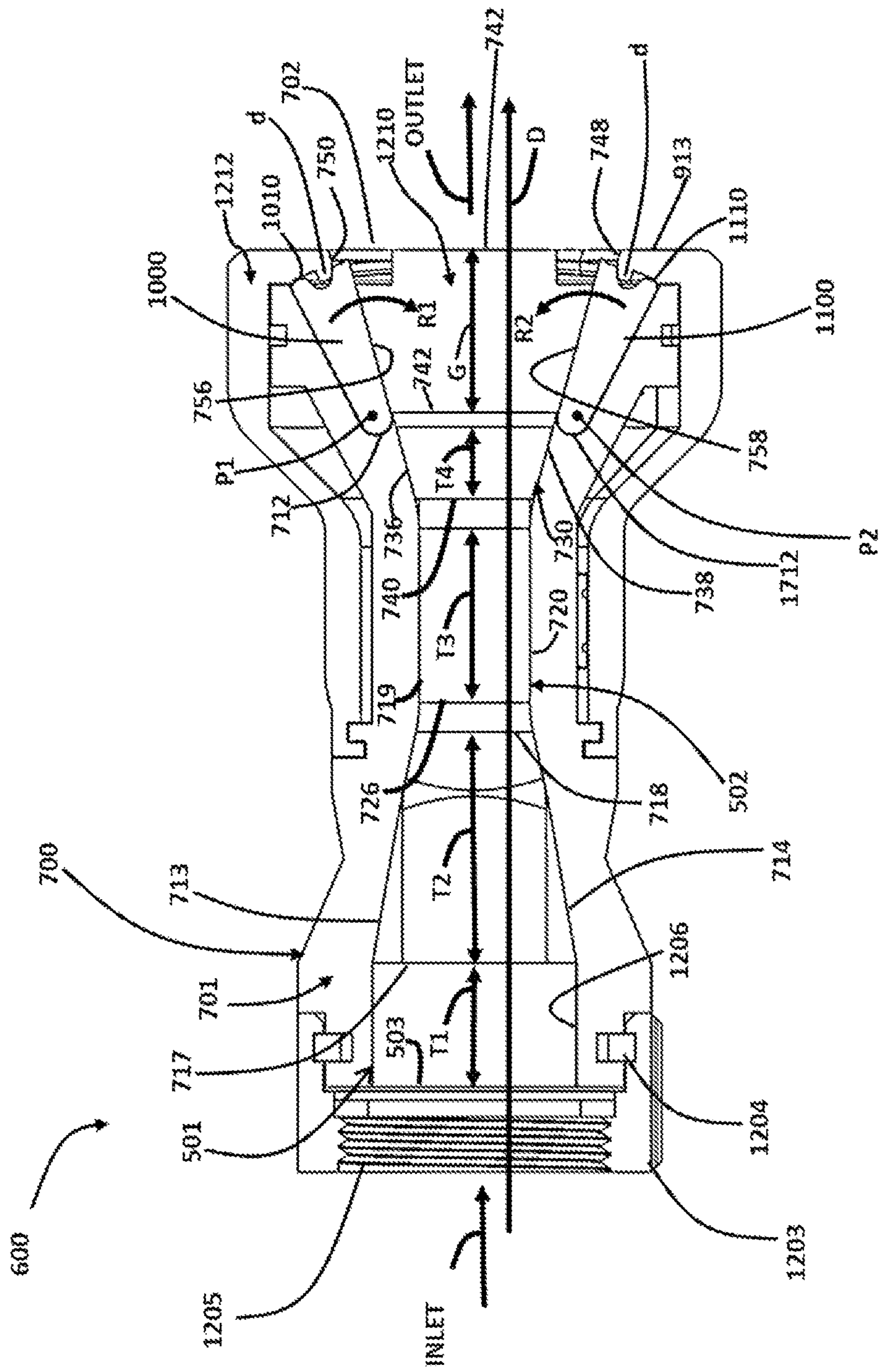
FIG. 3 is a top view in section of the smooth bore nozzle of FIG. 1 showing the fluid flow path, in which adjustable pivot arms for modulating spray width are actuated to provide a relatively wide exit stream.
Figure 4:
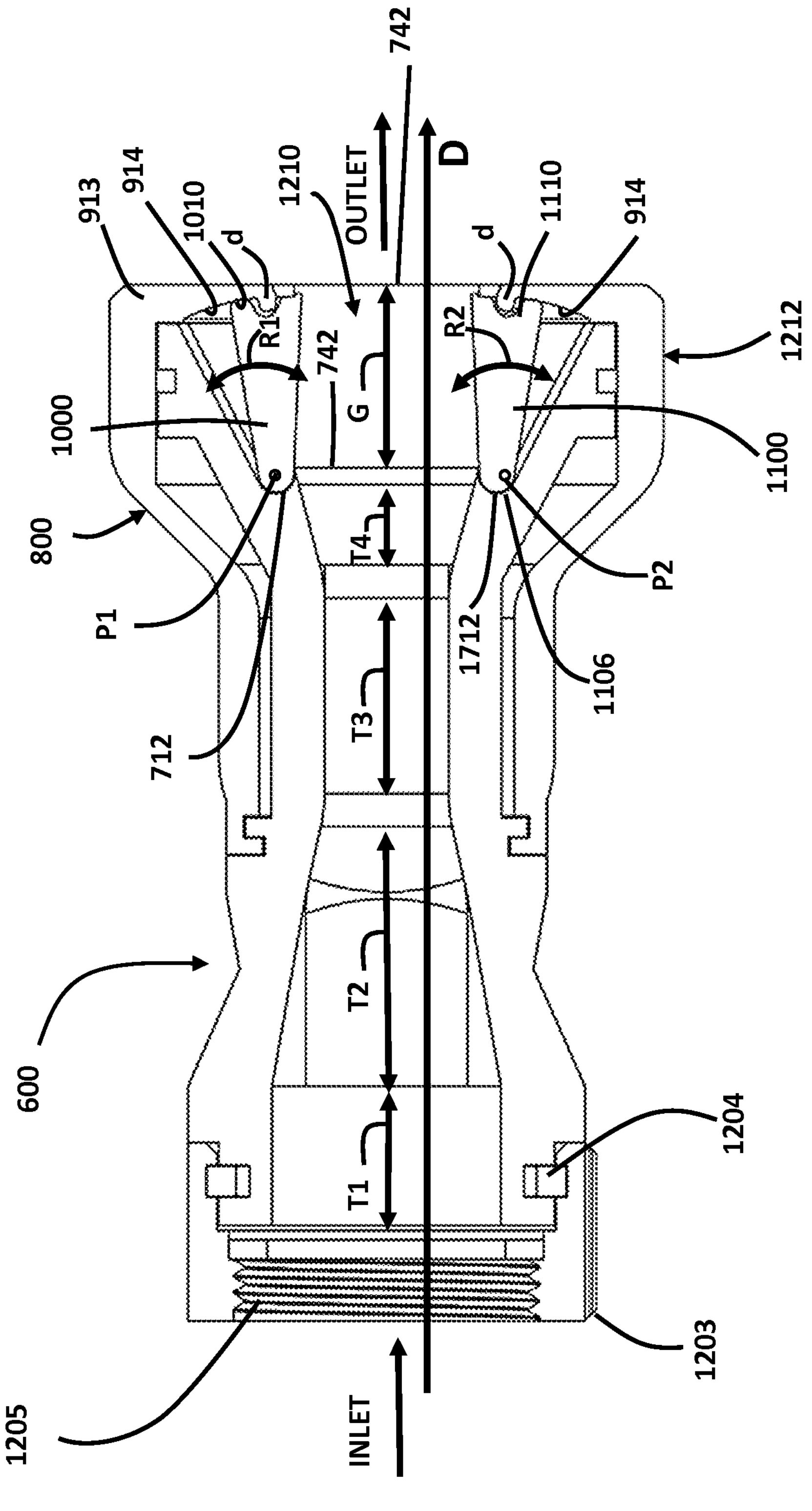
FIG. 4 is a top view in section of the smooth bore nozzle of FIG. 1 showing the fluid flow path, in which the adjustable pivot arms are pivoted to provide a relatively narrow exit stream.
Figure 6:
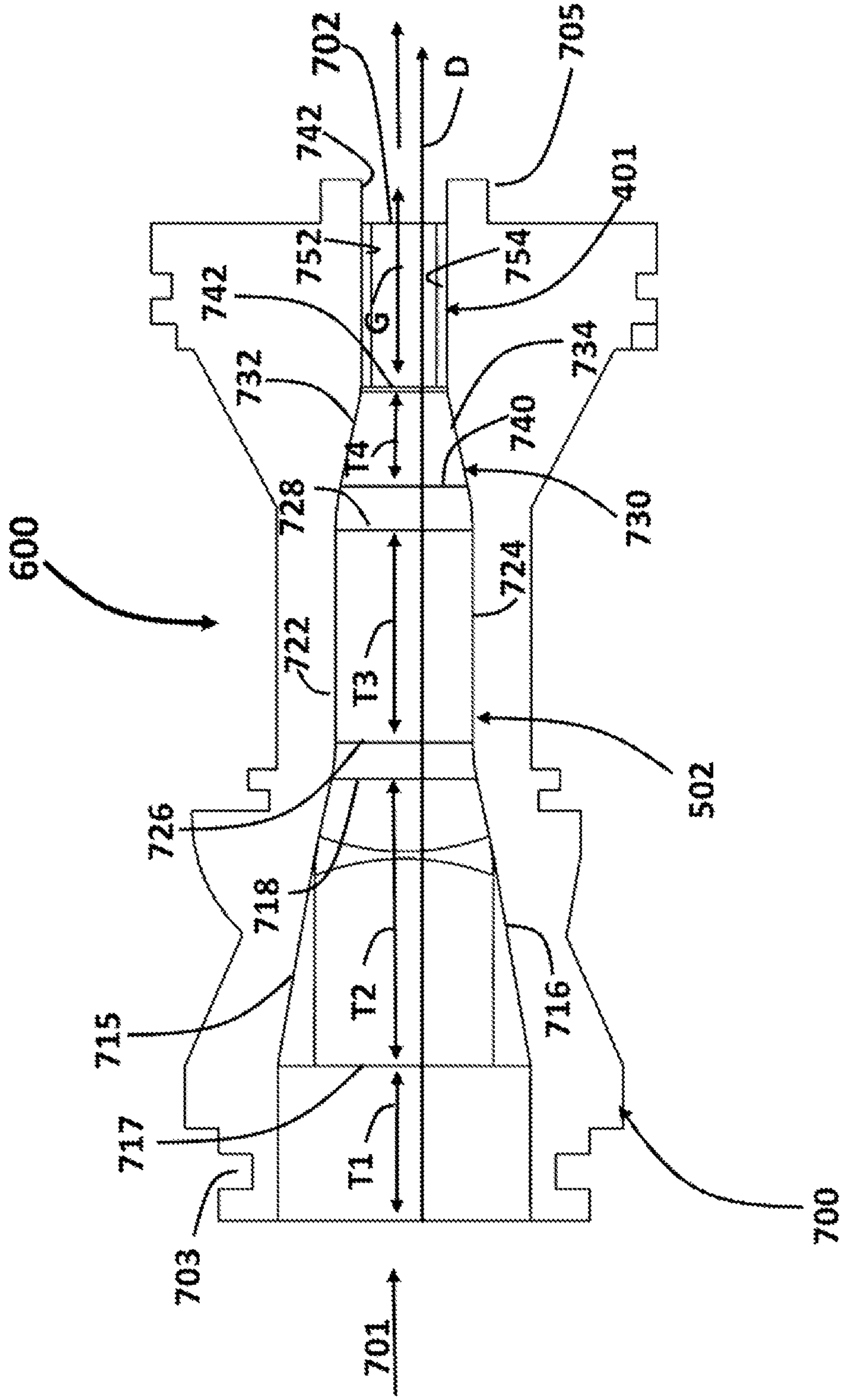
FIG. 6 is a side elevation in section of the smooth bore nozzle of FIG. 1 showing the fluid flow path.

In an embodiment, the outlet section 730 terminates in a modulation segment 401 that defines a modulation flow passageway G (see, e.g., FIGS. 3, 4, and 6). The modulation segment 401 terminates in a nozzle outlet 702. The nozzle outlet 702 is defined by parallel opposing top and bottom outlet edges 744, 746, respectively, rectilinear along entire lengths thereof, and first and second opposing side edges 748, 750, respectively, wherein the opposing top and bottom outlet edges are parallel and contiguous with flat, parallel outlet top and bottom walls 752, 754, respectively, of the modulation segment 401. In an embodiment, the modulation segment 401 includes first and second opposing side walls 756, 758 that diverge and are a linear continuation of outlet extension side walls 736, 738 of outlet section 730.

In an embodiment, the side walls 756, 758 and outlet extension side walls 736, 738 are continuous, smooth, and the fluid pathway is unobstructed along its length. Similarly, the walls of the transition section 501 and the inlet section 701 are continuous, smooth, and provide an unobstructed fluid pathway. Accordingly, in an embodiment, the inlet opening 717 of the inlet section 701 is rectangular and a periphery of the inlet opening of the inlet section is contiguous with a periphery of the rectangular outlet of the transition section 501.

In an embodiment, the outlet section 730 and modulation segment 401, which define the modulation flow passageway G, provide a smooth fluid pathway to the nozzle outlet 702. This is accomplished by the modulation segment 401 having first and second opposed diverging planar side walls 756, 758 contiguous with the first and the second opposing diverging outlet extension side walls 736, 738, and parallel top and bottom walls 752, 754 contiguous with the converging outlet top and bottom walls 732, 734. The first and the second side walls 756, 758 are contiguous with the first and the second opposing outlet side walls 736, 738 and terminate in the unobstructed rectangular modulation segment 401 from the outlet section inlet opening 740 to receive the fluid from the straight section outlet opening 728 and terminating in the oblong nozzle opening 702. In embodiments, the shape of the cross section of the oblong nozzle outlet 702 is selected from a rhombus, a rectangle, and an ellipse. In embodiments, the shape of the outlet 702 would be cast or machined to have rounded corners to avoid stress concentrations.

In embodiments, a divergence angle of up to 30° made by the diverging first and the second opposing outlet side walls 736, 738 (and extending to opposed planar side walls 756, 758) with the first and second parallel side walls 719, 720, a length of the straight section T3 is at least 2 times a height h of the cross section of the straight section outlet opening 728. In embodiments, a height hx between the outlet top and bottom walls at a distance x from the outlet section inlet opening is determined by equation (6).

In an embodiment, the diverging first and the second opposing outlet side walls 736, 738 each have a first segment that diverges from a centerline of the outlet section, represented by linear flow pathway D, at a first angle and a second segment, downstream of the first segment, that diverges from a centerline of the outlet section fluid passageway at a second angle that is greater than the first angle. In an embodiment, the second segment takes the form of side walls 756, 758 of modulation segment 401. In an embodiment, the second segment is adjacent and is contiguous with the first segment. In an embodiment, the first segment and the second segment of the diverging first and the second opposing outlet side walls 736, 738 are each smooth and planar in shape. In an embodiment, the second segments are contiguous with the first segments and make an angle with the first segments that does not exceed 30°.

In one exemplary embodiment, a nozzle 600 includes an inlet section 701 having a first and a second smooth, planar opposing inlet side walls 713, 714 and smooth, planar opposing inlet top and bottom walls 715, 716. The first and the second inlet side walls 713, 714 and the inlet top and bottom walls 715, 716 are contiguous and form an inlet opening 717, an inlet section outlet opening 718, and an unobstructed rectangular inlet section fluid passageway T2 from the inlet section inlet opening to the inlet section outlet opening. At least one pair of the first and second opposing inlet side walls 713, 714 and the inlet top and bottom walls 715, 716 are converging such that a cross sectional area of the inlet section fluid passageway decreases continuously from the inlet section inlet opening to the outlet section outlet opening.

The inlet section 701 is contiguous with a straight section 502 having first and second smooth, planar opposing parallel side walls 719, 720 contiguous with the first and the second inlet side walls 713, 714, respectively, and having smooth, planar opposing parallel top and bottom walls 722, 724 that are contiguous with the inlet top and bottom walls 715, 716. The first and the second opposing parallel bottom walls 722, 724 and the opposing parallel top and bottom walls 719, 720 form a straight section inlet opening 726 attached to receive the fluid from the inlet section outlet opening 718, a straight section outlet opening 728, and an unobstructed rectangular straight section fluid passageway T3 from the straight section inlet opening to the straight section outlet opening.

The outlet section 730 includes smooth, planar opposing converging outlet top and bottom walls 732, 734 contiguous with the parallel top and bottom walls 722, 724, respectively, and is contiguous with first and second opposing diverging outlet side walls 736, 738 that are contiguous with the first and second parallel side walls 719,720. The outlet top and bottom walls 732, 734 are contiguous with the first and the second outlet extension side walls 736, 738 to form an outlet section inlet opening 740 attached to receive the fluid from the straight section outlet opening 728 and form an unobstructed rectangular outlet section fluid passageway T4 from the outlet section inlet opening to terminate in an oblong variable outlet opening 742. At least one pair of the first and second opposing outlet side walls 736, 738 and the outlet top and bottom walls 732,734 are diverging such that a cross sectional area of the outlet section fluid passageway T4 decreases continuously from the outlet section inlet opening 740 to the oblong variable outlet opening 742.

As the cross-sectional area of the rectangular inlet fluid passageway T2 and a cross-sectional area of the rectangular outlet section fluid passageway T4 decrease in a downstream direction, a perimeter of a cross section of the rectangular inlet section decreases along a length of the inlet section 701 and a perimeter of a cross section of the rectangular outlet section fluid passageway T4 increases along a length of the outlet section 730. The rectangular inlet fluid passageway T2, the straight section fluid passageway T3, and the outlet section fluid passageway T4 together define a continuous nozzle fluid passageway D symmetrical about central planes of the adjustable nozzle 600 extending in a fluid flow direction. In an embodiment, the nozzle 600 is bilaterally symmetric about the fluid passageway D, being symmetric as shown in FIGS. 3, 4, and 6.

In an embodiment, the inlet section 701 includes a transition section 501 having a round inlet 503, a rectangular outlet that coincides with inlet opening 717 of the inlet section 701, and a continuous side wall 1206 that extends between the round inlet and the rectangular outlet and defines a fluid pathway T1 attached to the inlet opening of the inlet section. The continuous side wall 1206 is defined by an entrance wall segment circular in cross section that transitions to an exit wall segment that is rectangular in cross section. In an embodiment, the transition section 501 is unitary and contiguous with the inlet section 701.

In an embodiment, a method of making a nozzle 600 includes forming an inlet section 701 having a first and a second smooth, planar opposing converging inlet side walls 713, 714 and smooth, planar opposing converging inlet top and bottom walls 715, 716 and attaching the first and the second inlet side walls to the inlet top and bottom walls to form an inlet opening 717, an inlet section outlet opening 718, and an unobstructed rectangular inlet section fluid passageway T2 from the inlet opening to the inlet section outlet opening. A straight section 502 is formed having first and second smooth, planar opposing parallel side walls 719, 720 and smooth, planar opposing parallel top and bottom walls 722, 724 such that the first and the second parallel side walls are attached to the parallel top and bottom walls to form a straight section inlet opening 726, a straight section outlet opening 728, and an unobstructed rectangular straight section fluid passageway T3 from the straight section inlet opening to the straight section outlet opening.

The first and the second parallel side walls 719, 720 are attached to the first and the second inlet side walls, 713, 714, respectively, and the parallel top and bottom walls 722, 724 are attached to the converging inlet top and bottom walls to receive the fluid from the inlet section outlet opening 718. An outlet section 730 is formed having smooth, planar opposing converging outlet top and bottom walls 732, 734 and first and second smooth, planar opposing diverging outlet extension side walls 736, 738 that are contiguous with the opposing converging outlet top and bottom walls to form an outlet section inlet opening 740 attached to receive the fluid from the straight section outlet opening 718 and a variable outlet opening 742. The top and bottom walls 732, 734 and outlet extension side walls 736, 738 form an unobstructed rectangular outlet section fluid passageway T4 from the outlet section inlet opening 740 to terminate in an oblong outlet opening.

The outlet top and bottom walls 732, 734 are attached to the parallel top and bottom walls 722, 724, and the first and second opposing diverging outlet side walls 736, 738 are attached to the first and the second parallel side walls 719, 720. A cross-sectional area of the rectangular inlet section fluid passageway T2 and a cross-sectional area of the rectangular outlet section fluid passageway T4 decrease in a downstream direction, and a perimeter of a cross section of the rectangular inlet section decreases along a length of the inlet section and a perimeter of a cross section of the rectangular outlet section fluid passageway increases along a length of the outlet section. The rectangular inlet fluid passageway T2, the straight section fluid passageway T3, and the outlet section fluid passageway T4 together define a continuous nozzle fluid passageway D symmetrical about a the central planes of the nozzle extending in a fluid flow direction.

In an exemplary embodiment (see FIGS. 1-8), the nozzle 600 takes the form of an adjustable nozzle. In the embodiment shown in the figures, the adjustable nozzle 600 is configured to vary a width of the fluid stream exiting the nozzle outlet 702 within a predetermined range. The adjustable nozzle 600 includes a nozzle body 700 having an inlet section 701 with an inlet section opening 717, an outlet section 730 in which the nozzle outlet 702 of the modulation segment 401 takes the form of a variable outlet opening 742, and the fluid flow path D extends from the inlet opening to the outlet opening. The modulation segment 401 takes the form of an adjustable spray restrictor segment 1210 in the outlet section 730.

The adjustable nozzle 600 includes an actuator 1212 that displaces the adjustable spray restrictor segment 1210 toward and away from a center of the fluid flow path D, thereby varying an effective width W (see FIG. 5) of the variable outlet opening 742 to vary a pattern of fluid flowing from the fluid flow path D through the variable outlet opening 742. In an embodiment, the actuator 1212 includes a manually positionable adjustment collar 800 (see FIGS. 7 and 8), which in embodiments is in the form of two complementary halves 899, 900, that is rotatably mounted on the nozzle body 700. Manual rotation of the adjustment collar 800 relative to the nozzle body 700 displaces the adjustable spray restrictor segment 1210.

Optionally, the adjustment collar 800 includes an indicator tab 801 that corresponds to a position of the adjustable spray restrictor segment 1210 and mating tabs 808, 908 and grooves 812, 912 that effect proper mating of the halves 899, 900. In an embodiment, the adjustment collar 800 includes a second set of mating tabs 804, 904 and grooves 813, 914 that facilitate proper mating of the complementary halves 899, 900 during assembly. Optionally, the tabs include screw holes 810, 910, 809, 909, 806, 906, 805, 905 to receive screws (not shown) to secure the complementary halves 899, 900 together.

Figure 9:
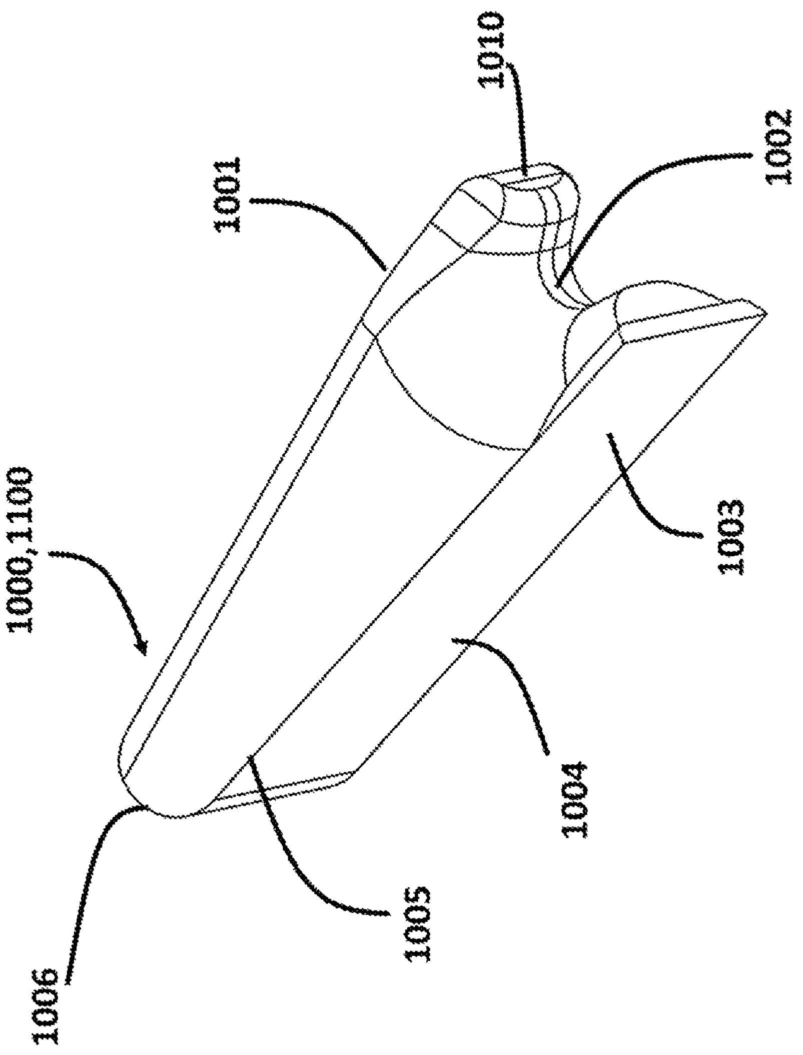
FIG. 9 is a perspective view of an embodiment of a pivot arm of the embodiment of FIG. 1.

As shown in FIGS. 3, 4, and 9, in an embodiment, the adjustable spray restrictor segment 1210 includes at least a first spray adjustment arm 1000 that is displaced by rotation of the adjustment collar 800 toward and away from the center of the fluid flow path D to vary the effective width W of the variable outlet opening 742. In an embodiment, the first spray adjustment arm 1000 makes a pivotal engagement with the outlet section 730 and includes a downstream bearing surface 1010 that engages the adjustment collar 800.

In an embodiment, the nozzle body 700 includes a first bearing recess 712 in the outlet section 730 (see FIGS. 3 and 4). The first spray adjustment arm 1000 includes an upstream bearing surface 1006 (see FIG. 9) that engages the first bearing recess 712 to make the pivotal engagement about a first pivot point P1. In an embodiment, the adjustment collar 800 includes an upstream end face 913 having an internal or upstream eccentric groove 914 extending about the variable outlet opening 742 that receives and engages the downstream bearing surface 1010, such that rotation of the adjustment collar pivots the first spray adjustment arm toward and away from the center of the fluid flow path D (see FIGS. 3 and 4). The radially inner boundary of the eccentric groove 914 is bounded and defined at an outer perimeter by an eccentric ridge d.

In an embodiment, the eccentric groove 914 is shaped to pivot the first spray adjustment arm 1000 between a first position, shown in FIG. 4, resulting in a minimum spray width W and a second position, shown in FIG. 3, resulting in a maximum spray width. In an embodiment, the eccentric groove 914 is in the form of a camming surface that engages the downstream bearing surface 1010 of the first spray adjustment arm 1000, and the camming surface is curved, having a radius of curvature that corresponds to a radius of the first spray adjustment arm from the first pivot point P1 to the camming surface of the eccentric groove 914. In embodiments, the eccentric groove 914 is formed of groove segments 802, 902 on the complementary halves 899, 900.

Figure 10:
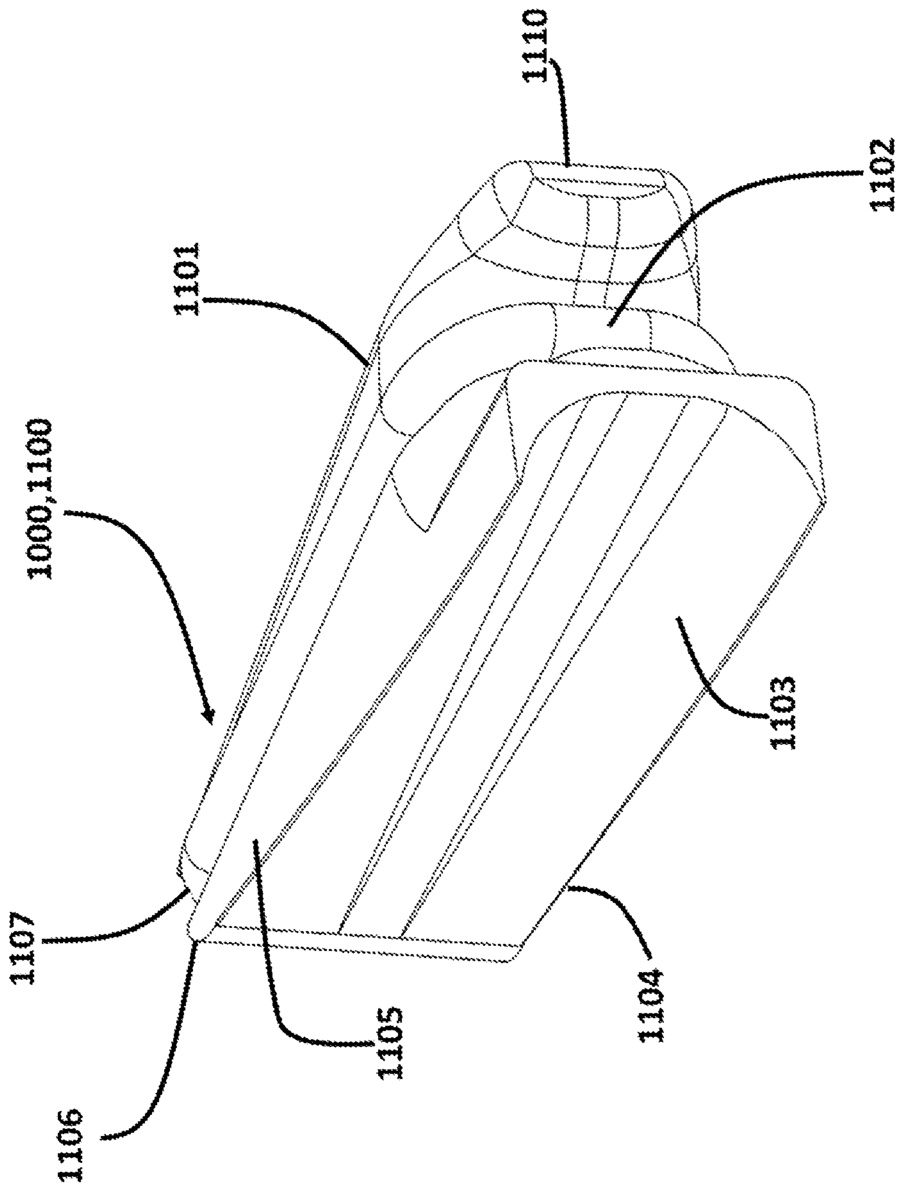
FIG. 10 is a perspective view of another embodiment of a pivot arm of the embodiment of FIG. 1.

In an embodiment, the adjustable spray restrictor segment 1210 includes a second spray adjustment arm 1100 that is opposed to the first spray adjustment arm 1000. The second spray adjustment arm 1100 is also displaced by rotation of the adjustment collar 800 toward and away from the center of the fluid flow path D to vary the effective width W of the variable outlet opening 742. The nozzle body 700 includes a second bearing recess 1712 in the outlet section. As shown in FIG. 10, the second spray adjustment arm 1100 includes an upstream bearing surface 1106 that engages the second bearing recess 1712 to make a pivotal engagement with the outlet section about a second pivot point P2 and a downstream bearing surface 1110 that engages the camming surface of the eccentric groove 914 of the adjustment collar 800.

In an embodiment, the outlet section 703 of the adjustable nozzle 600 includes the modulation segment 401 in the form of a terminal segment having opposed planar, parallel top and bottom walls 752, 754 and first and second opposed planar side walls 756, 758 contiguous with the top and bottom walls. The first and second spray adjustment arms 1000, 1100 are mounted in the terminal segment to pivot toward and away from the first and second side walls 756, 758, respectively, when displaced by rotation of the adjustment collar 800.

In an embodiment, the adjustment collar 800 is connected to the first and second spray adjustment arms 1000, 1100 to pivot the first and second spray adjustment arms relative to the terminal segment of the modulation segment 401 toward and away from the first and second opposed planar side walls 756, 758 to selectively vary the effective width W of the variable outlet opening 742. In an embodiment, the first and second spray adjustment arms 1000, 1100 are pivotally mounted at the upstream ends of the bearing surfaces 1006, 1106, respectively, thereof to the first and second bearing recesses 712, 1712, respectively, of the first and second side walls 756, 758.

In one embodiment shown in FIG. 9, the first and second spray adjustment arms 1000, 1100 (only one first spray adjustment arm 1000 is shown, it being understood that for this embodiment spray adjustment arm 1100 is identical thereto) include a guide surface 1003 that faces the center C (FIG. 11) of the fluid flow path D. The upstream bearing surface 1006, which is curved to match the curvature of the first bearing recess 712, is connected to the downstream bearing surface 1010 by a spine 1001 that is opposite the guide surface 1003.

In another embodiment shown in FIG. 10, the first and second spray adjustment arms 1000, 1100 (only one second spray adjustment arm 1100 is shown, it being understood that first spray adjustment arm 1000 is identical thereto) include a guide surface 1103 that faces the center C of the fluid flow path D. The upstream bearing surface 1106, which is curved to match the curvature of the second bearing recess 1712, is connected to the downstream bearing surface 1110 by a spine 1101. The guide surfaces 1003, 1103 are positioned in the terminal segment of the modulation or outlet section 730 to contact fluid flowing through the terminal segment of the modulating segment 401 and define the effective width W of the straight section variable outlet opening 728.

In the embodiment of FIG. 9, the guide surfaces 1003 of the first and second adjustment arms 1000, 1100 are substantially flat and planar. In the embodiment of FIG. 10, the guide surfaces 1103 of the first and second spray adjustment arms 1000, 1100 are curved in a width direction (i.e., the "h" dimension in FIG. 5). As shown in the embodiment of FIG. 10, the guide surfaces 1103 of the first and second adjustment arms 1000, 1100 are shaped to transition in a downstream direction from a flat contour to a curved contour in a width direction. In an embodiment, the first and second spray adjustment arms 1000, 1100 include flat upper and lower surfaces 1004, 1005 and 1104, 1105, respectively, that bear against, but pivot relative to, the top and bottom walls 752, 754 of the modulation segment 401 to provide a fluid seal.

Also, in the embodiment shown in FIG. 10, the first and second adjustment arms 1000, 1100 (only second adjustment arm 1100 is shown in FIG. 10, it being understood that spray adjustment arm 1000 is identical thereto in this embodiment) optionally include a gasket 1107 that extends about the adjustment arm in an annular, longitudinal recess between the spine 1101 and the face 1103. This gasket prevents fluid leakage between the face 1103 and the top and bottom walls 752, 754 of the modulation segment 401. In embodiments, the gasket 1107 is made of rubber or an elastomer.

In both the embodiments shown in FIGS. 9 and 10, the first and second spray adjustment arms 1000, 1100 include notches or cutouts 1002, 1102 that engage and are captured by the eccentric ridge d formed about the variable outlet opening 742. As the adjustment collar 800 is rotated relative to the adjustable nozzle 600, the first and second adjustment arms 1000, 1100, which pivot in response to the varying distance of the eccentric ridge d from the center of the fluid flow path D, vary the effective width W of the variable outlet opening 742. In embodiments, the eccentric ridge d is in the form of an ellipse, but also can be in the form of other eccentric (i.e., non-circular) shapes to provide different responses in width of the spray pattern exiting the variable outlet opening 742 corresponding to a given rotation of the adjustment collar 800.

Figure 7:
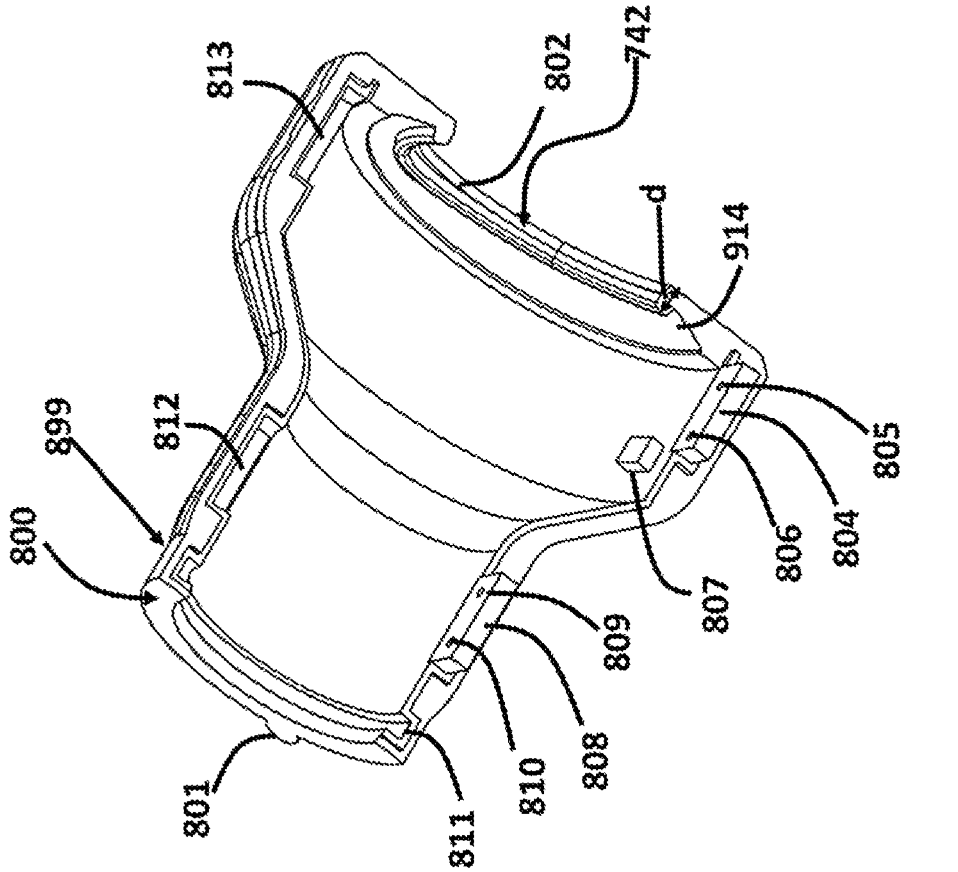
FIG. 7 is a perspective view of the interior of a first adjustment collar element of the embodiment of FIG. 1.
Figure 8:
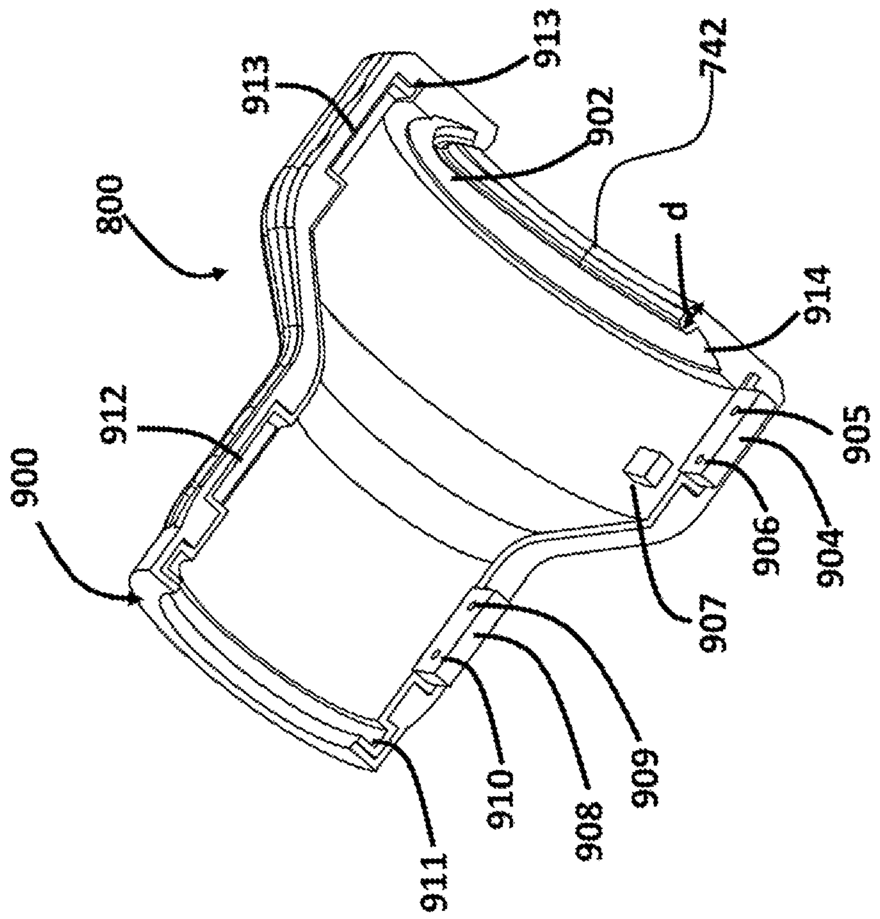
FIG. 8 is a perspective view of the interior of a second adjustment collar element of the embodiment of FIG. 1.

As shown in FIGS. 7 and 8, in an embodiment the adjustment collar 800 includes stops or bosses 807, 907 positioned to engage cutouts 706, 707 formed in the outer periphery of the nozzle body 700. The stops 807, 907 limit rotation of the adjustment collar 800 relative to the nozzle body 700 to a preselected amount. In an embodiment, the relative rotation is limited to a 90° clockwise and counterclockwise rotation. The eccentric groove 914 is sized and shaped such that such a 90° relative rotation of the adjustment collar 800 will cause the first and second spray adjustment arms 1000, 1100 to pivot from their maximum separation shown in FIG. 3, and hence maximum effective width W of the variable outlet opening 742 and fluid stream exiting the variable outlet opening, to their minimum separation shown in FIG. 4, and hence minimum effective width W of the variable outlet opening and exiting fluid stream.

While the forms of apparatus and methods disclosed herein constitute preferred embodiments of the disclosed smooth bore nozzle, it is to be understood that the invention is not limited to these precise forms of apparatus and methods, and that changes may be made therein without departing from the scope of the invention.

What is claimed is:

1. A smooth bore nozzle, comprising:

an inlet section having a first and a second smooth, planar opposing converging inlet side walls contiguous with smooth, planar opposing converging inlet top and bottom walls, the first and the second inlet side walls and the inlet top and bottom walls forming an inlet section opening, an inlet section outlet opening, and an unobstructed rectangular inlet section fluid passageway from the inlet section opening to the inlet section outlet opening;

a straight section having first and second smooth, planar opposing parallel side walls contiguous with the first and the second inlet side walls, respectively, and contiguous with smooth, planar opposing parallel top and bottom walls that are contiguous with the inlet top and bottom walls, respectively, wherein the first and the second opposing parallel side walls and the opposing parallel top and bottom walls form a straight section inlet opening attached to receive the fluid from the inlet section outlet opening, a straight section outlet opening, and an unobstructed rectangular straight section fluid passageway from the straight section inlet opening to the straight section outlet opening; and an outlet section having smooth, planar opposing converging outlet top and bottom walls contiguous with the parallel top and bottom walls, respectively, and contiguous with first and second opposing diverging outlet side walls that are contiguous with the opposing parallel side walls, wherein the outlet top and bottom walls are contiguous with the first and the second outlet side walls to form an outlet section inlet opening attached to receive the fluid from the straight section outlet opening and an unobstructed rectangular outlet section fluid passageway from the outlet section inlet opening to terminate in an oblong outlet opening;

wherein a cross-sectional area of the rectangular inlet fluid passageway and a cross sectional area of the rectangular outlet section fluid passageway remain constant or decrease in a downstream direction, and a perimeter of a cross section of the rectangular inlet section decreases along a length of the inlet section and a perimeter of a cross section of the rectangular outlet section fluid passageway increases along a length of the outlet section.

2. The nozzle of claim 1, wherein a rate of convergence of the opposing converging inlet side walls and/or the converging inlet top and bottom walls is greater than a rate of divergence of the first and the second opposing diverging outlet side walls, such that a velocity of a fluid flowing through the nozzle increases.

3. The nozzle of claim 1, wherein the oblong outlet opening is defined by parallel opposing top and bottom outlet edges rectilinear along entire lengths thereof and first and second opposing side edges, wherein the opposing top and bottom outlet edges are parallel with the outlet top and bottom walls.

4. The nozzle of claim 1, further comprising a modulation segment that extends from the outlet section and includes first and second opposing side edges that diverge and are a linear continuation of the diverging outlet side walls.

5. The nozzle of claim 1, further comprising a transition section having a round inlet, a rectangular outlet contiguous with the inlet opening of the inlet section, and a continuous side wall that extends between the round inlet and the rectangular outlet and defines a transition fluid pathway attached to the inlet opening of the inlet section.

6. The nozzle of claim 5, wherein the transition section and the inlet section are unitary.

7. The nozzle of claim 5, wherein the continuous side wall is smooth, and the transition fluid pathway is unobstructed along its length.

8. The nozzle of claim 5, wherein the inlet opening of the inlet section is rectangular and a periphery of the inlet opening of the inlet section is contiguous with a periphery of the rectangular outlet of the transition section.

9. The nozzle of claim 1, wherein the outlet opening includes a modulation segment, the modulation segment having first and second parallel opposing extension side walls contiguous with the first and the second opposing diverging outlet section side walls, and parallel top and bottom extension walls contiguous with the converging outlet top and bottom walls, the first and the second extension side walls being contiguous with the first and the second opposing extension side walls to form an unobstructed rectangular outlet extension section fluid passageway from the outlet extension section inlet opening to receive the fluid from the straight section outlet opening and terminating in an oblong outlet opening.

10. The nozzle of claim 1, wherein a shape of a cross section of the oblong outlet opening is selected from a rhombus, a rectangle, and an ellipse.

11. The nozzle of claim 1, wherein for a divergence angle of up to 30° made by the first and the second opposing diverging outlet side walls with the opposing parallel side walls, a length of the straight section is at least 2 times a height of a cross section of the straight section outlet opening.

12. The nozzle of claim 7, wherein a height $h_x$ between the outlet top and bottom walls at a distance x from the outlet section inlet opening is determined by the equation $h_x=K[W_1h_1/(W_1+(2\tan\theta))]$, where $W_1$ is a width of the outlet section inlet opening, $h_1$ is a height of the outlet section inlet opening, and $K\leq 1$.

13. The nozzle of claim 1, wherein the outlet section first and second opposing diverging outlet side walls each have a first segment that diverges from a centerline of the outlet section fluid passageway at a first angle and a second segment downstream of the first segment that diverges from a centerline of the outlet section fluid passageway at a second angle that is greater than the first angle.

14. The nozzle of claim 13, wherein the second section is adjacent and is contiguous with the first section.

15. The nozzle of claim 13, wherein the first segment and the second segment of the outlet section first and second opposing diverging outlet side walls are each smooth and planar in shape.

16. The nozzle of claim 15, wherein the second segments are contiguous with the first segments and make an angle with the first segments that does not exceed 30°.

17. A nozzle, comprising:

an inlet section having a first and a second smooth, planar opposing inlet side walls and smooth, planar opposing inlet top and bottom walls, the first and the second inlet side walls and the inlet top and bottom walls are contiguous and form an inlet opening, an inlet section outlet opening, and an unobstructed rectangular inlet section fluid passageway from the inlet section inlet opening to the inlet section outlet opening, wherein at least one pair of the first and second opposing inlet side walls and the inlet top and bottom walls being converging such that a cross sectional area of the inlet section fluid passageway decreases continuously from the inlet section inlet opening to the outlet section outlet opening;

a straight section having first and second smooth, planar opposing parallel side walls contiguous with the first and the second inlet side walls, respectively, and having smooth, planar opposing parallel top and bottom walls that are contiguous with the inlet top and bottom walls, respectively, wherein the first and the second opposing parallel side walls and the opposing parallel top and bottom walls form a straight section inlet opening attached to receive the fluid from the inlet section outlet opening, a straight section outlet opening, and an unobstructed rectangular straight section fluid passageway from the straight section inlet opening to the straight section outlet opening; and an outlet section having smooth, planar opposing converging outlet top and bottom walls contiguous with the parallel top and bottom walls, respectively, and contiguous with first and second opposing diverging outlet side walls that are contiguous with the opposing parallel side walls, wherein the outlet top and bottom walls are contiguous with the first and the second outlet side walls to form an outlet section inlet opening attached to receive the fluid from the straight section outlet opening and an unobstructed rectangular outlet section fluid passageway from the outlet section inlet opening to terminate in an oblong outlet opening, wherein at least one pair of the first and second opposing outlet side walls and the outlet top and bottom walls being diverging such that a cross sectional area of the outlet section fluid passageway decreases continuously from the outlet section inlet opening to the oblong outlet opening;

wherein as the cross-sectional area of the rectangular inlet fluid passageway and a cross sectional area of the rectangular outlet section fluid passageway decrease in a downstream direction, a perimeter of a cross section of the rectangular inlet section decreases along a length of the inlet section and a perimeter of a cross section of the rectangular outlet section fluid passageway increases along a length of the outlet section; and wherein the rectangular inlet fluid passageway, the straight section fluid passageway, and the outlet section fluid passageway together define a continuous nozzle fluid passageway symmetrical about a central plane of the nozzle extending in a fluid flow direction.

18. The nozzle of claim 17, wherein the inlet section includes a transition section having a round inlet, a rectangular outlet contiguous with the inlet opening of the inlet section, and a continuous side wall that extends between the round inlet and the rectangular outlet and defines a fluid pathway attached to the inlet opening of the inlet section that is defined by an entrance wall segment circular in cross section that transitions to an exit wall segment that is rectangular in cross section.

19. The nozzle of claim 18, wherein the transition section is unitary and contiguous with the inlet section.

* * * * *